United States Patent [19]
Witthaus

[11] Patent Number: 5,494,128
[45] Date of Patent: Feb. 27, 1996

[54] FLUID COUPLING FOR SMALL ENGINE WITH DIRECT WHEEL DRIVE

[75] Inventor: Charles A. Witthaus, Hayward, Calif.

[73] Assignee: Patmont Motor Werks, Pleasanton, Calif.

[21] Appl. No.: 136,440

[22] Filed: Oct. 13, 1993

[51] Int. Cl.$^6$ ............ B62K 11/10; B62M 7/12; B62M 13/00
[52] U.S. Cl. ............ 180/221; 180/305; 180/342; 60/367
[58] Field of Search ............ 180/221, 305, 180/307, 342, 367; 60/367

[56] References Cited

U.S. PATENT DOCUMENTS

| | | | |
|---|---|---|---|
| 2,115,895 | 5/1938 | Weihmann | 60/367 X |
| 2,139,107 | 12/1938 | Alison | 60/367 |
| 2,294,994 | 9/1942 | Maze | 180/367 X |
| 2,663,149 | 12/1953 | Zeidler et al. | 60/367 X |
| 2,998,782 | 9/1961 | Ryan et al. | 60/367 X |
| 3,339,659 | 9/1967 | Wolf | 180/221 |
| 4,821,832 | 4/1989 | Patmont | 180/221 X |

FOREIGN PATENT DOCUMENTS

| | | | |
|---|---|---|---|
| 954847 | 1/1950 | France | 180/221 |
| 992450 | 10/1951 | France | 180/221 |
| 38779 | 10/1956 | Germany | 180/342 |
| 98342 | 5/1961 | Netherlands | 180/221 |
| 134326 | 1/1952 | Norway | 180/221 |
| 602252 | 5/1948 | United Kingdom | 180/221 |

*Primary Examiner*—Brian L. Johnson
*Attorney, Agent, or Firm*—Townsend and Townsend and Crew

[57] ABSTRACT

A fluid coupling directly-drive a wheel from a small engine. The fluid coupling is mounted in cantilevered support or two ended bearing support from a small engine and has a small diameter inner driven shaft and a larger diameter out wheel driving shaft for contacting and directly driving a wheel. The inner driven shaft connects to a pump having a relatively larger outer diameter than either the driven or driving shaft. This pump is mounted on the opposite side of the driven wheel from the engine and preferably includes rotating vanes within one half a toroidal path having an attached eccentrically mounted toroidal plug for causing helical rotation of fluid about the plug. A turbine mates to the pump and includes rotating vanes within the other half of the toroidal path, these vanes being shaped around the toroidal plug of the pump. The toroidal plug and toroidal volumes are eccentrically mounted one with respect to another to cause high velocity flow on the outside diameter of the pump and turbine with low velocity flow in the inside diameter of the pump and turbine. Fluid, typically oil, is confined to the pump and turbine by appropriate seals and causes torque conversion between the pump and turbine. In the preferred embodiment, a fuel tank for the engine is mounted overlying the driven wheel so as to shield the interface of the wheel and driving spindle. At the same time, the exterior of the driven pump is supplied with vanes to generate appropriate air cooling at the fluid coupling.

14 Claims, 6 Drawing Sheets

FLUID COUPLING FOR SMALL ENGINE WITH DIRECT WHEEL DRIVE

This invention relates to a fluid coupling or torque converter for a small engine which finds use with a direct wheel drive. The fluid coupling of this invention can be mounted in a cantilevered support from a small engine to directly drive the rear wheel of a small scooter or alternately to a beam type support in which the outboard bearing of the fluid coupler is supported from a strut, such as a plate reinforcing gas tank mounting.

BACKGROUND OF THE INVENTION

In U.S. Pat. No. 4,821,832 entitled MOTOR SCOOTER HAVING A FOLDABLE HANDLE AND FRICTION DRIVE of Steven J. Patmont Issued Apr. 18, 1989, there is disclosed a hydraulic fluid coupling or torque converter. This fluid coupling includes an inner motor driven shaft, an outer wheel driving shaft, and a fluid couple between the driven and driving shafts for producing in a motor scooter a fluid drive.

In what follows, an improvement on this fluid clutch is disclosed.

Fluid couplings are known. Particularly, torque converters have been utilized in all kinds of machinery, especially automobiles. With these torque converters, it is common to include, a driven shaft, a pump, a turbine, and a driving shaft. Commonly, these units are aligned serially one behind another. Thus, the entire power path from the engine to the driven part of the engine consumes a considerable linear distance needed for the fluid coupling between the serially aligned driven and driving paths.

SUMMARY OF THE INVENTION

A fluid coupling is disclosed for the direct drive of a wheel from a small engine. The fluid coupling is mounted in cantilevered support or two ended bearing support from a small engine and has a small diameter inner driven shaft and a larger diameter out wheel driving shaft for contacting and directly driving a wheel. The inner driven shaft connects to a pump having a relatively larger outer diameter than either the driven or driving shaft. This pump is mounted on the opposite side of the driven wheel from the engine and preferably includes rotating vanes within one half a toroidal path having an attached eccentrically mounted toroidal plug for causing helical rotation of fluid about the plug. A turbine mates to the pump and includes rotating vanes within the other half of the toroidal path, these vanes being shaped around the toroidal plug of the pump. The toroidal plug and toroidal volumes are eccentrically mounted one with respect to another to cause high velocity flow on the outside diameter of the pump and turbine with low velocity flow in the inside diameter of the pump and turbine. Fluid, typically oil, is confined to the pump and turbine by appropriate seals and causes torque conversion between the pump and turbine. In the preferred embodiment, a fuel tank for the engine is mounted overlying the driven wheel so as to shield the interface of the wheel and driving spindle. At the same time, the exterior of the driven pump is supplied with vanes to generate appropriate air cooling at the fluid coupling. A preferred embodiment is disclosed wherein the mount of the fluid coupler includes a bearing on the outboard end of the fluid coupler.

DESCRIPTION OF THE PREFERRED EMBODIMENT

Figure 1:
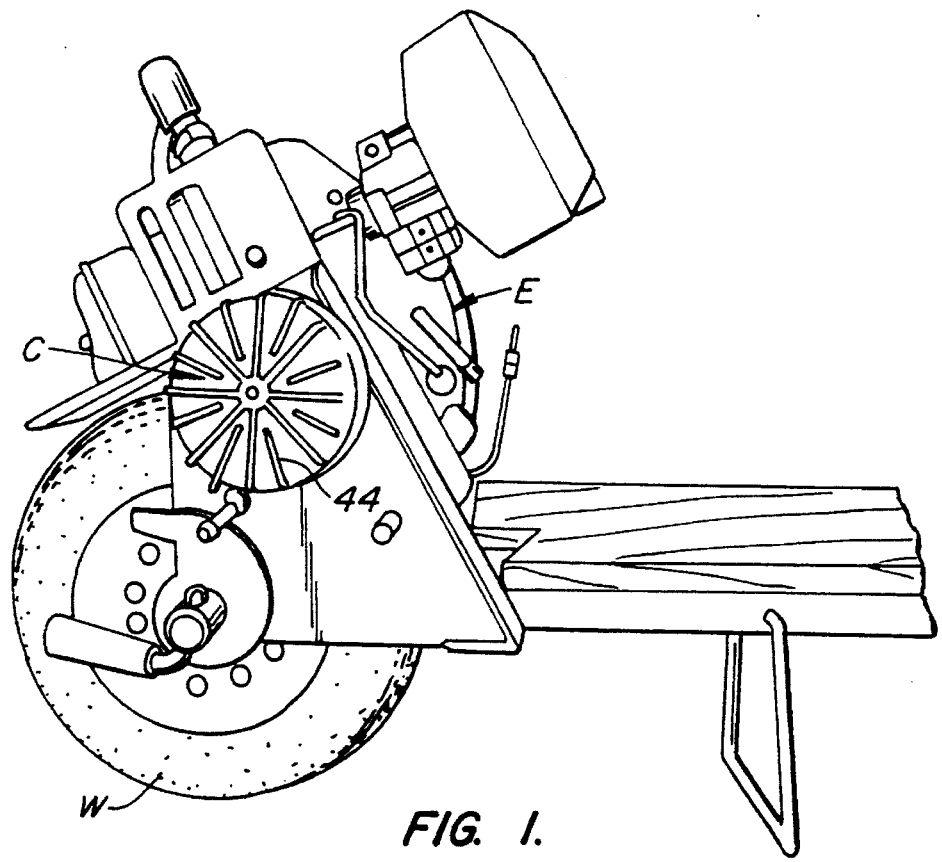
FIG. 1 is a perspective elevation of a scooter having the drive of this invention at the rear wheel.
Figure 2:
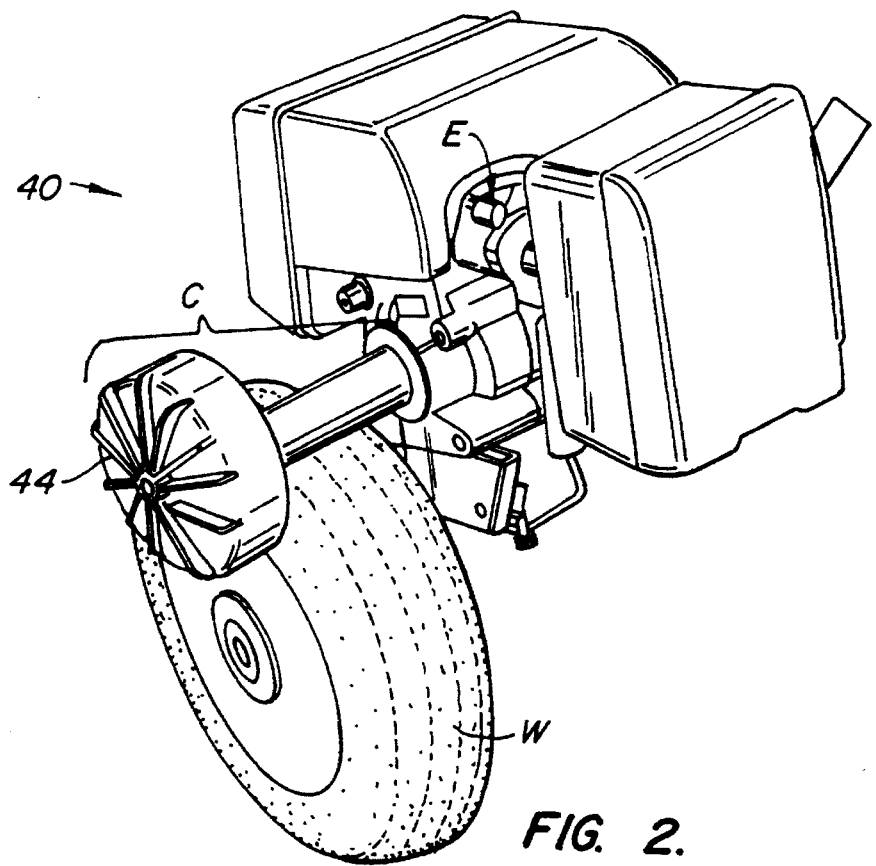
FIG. 2 is a an expanded perspective section of the fluid coupling illustrating the engine and fluid coupling suspended with respect to the driven wheel, the scooter chassis and wheel axle being omitted.

Referring to FIGS. 1 and 2, fluid coupling C is disclosed for the direct drive of wheel W from a small engine E. The fluid coupling is mounted in cantilevered support from small engine E, FIG.1 showing the engine and rear end of the scooter and FIG. 2 showing wheel and engine alone.

Figure 3:
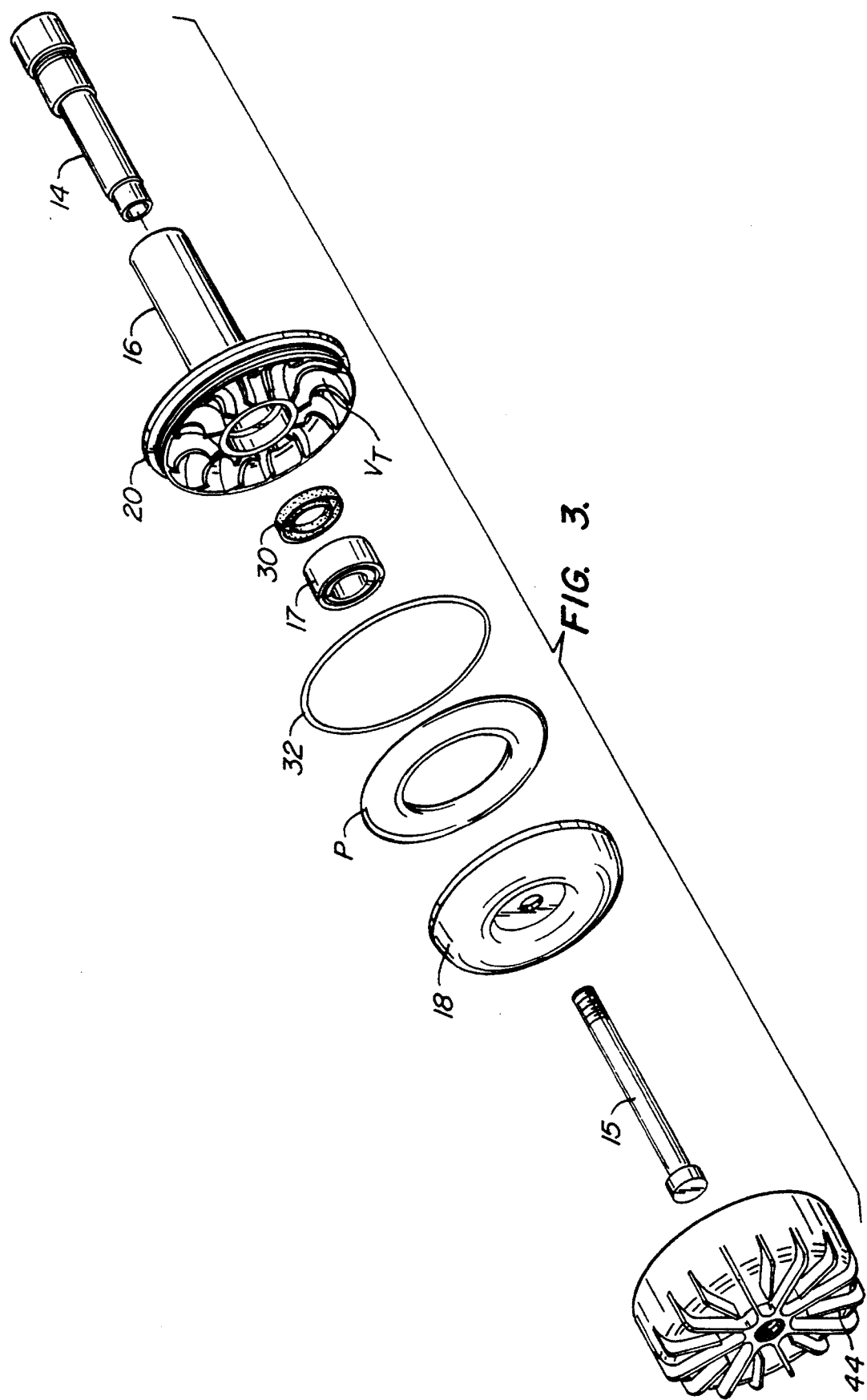
FIG. 3 is an exploded view of the fluid coupling relative to the engine from which the fluid coupling is mounted.

Referring to the exploded view of FIG. 3, fluid coupling C has a small diameter inner driven shaft 14 and larger diameter outer wheel driving shaft 16 for contacting and directly driving wheel W. Inner driven shaft 14 connects to pump 18 having a relatively larger outer diameter than either the driven shaft 14 or driving shaft 16. Such connection occurs by bolt 15 threading to driven shaft 14. Further, it can be seen that regular ball bearing 17 and needle bearings 19 provide the necessary rotating bearings to assure transfer of the rotation.

Referring back briefly to FIGS. 1 and 2, it can be seen this pump 18 is mounted on the opposite side of the driven wheel W from engine E.

Figure 5:
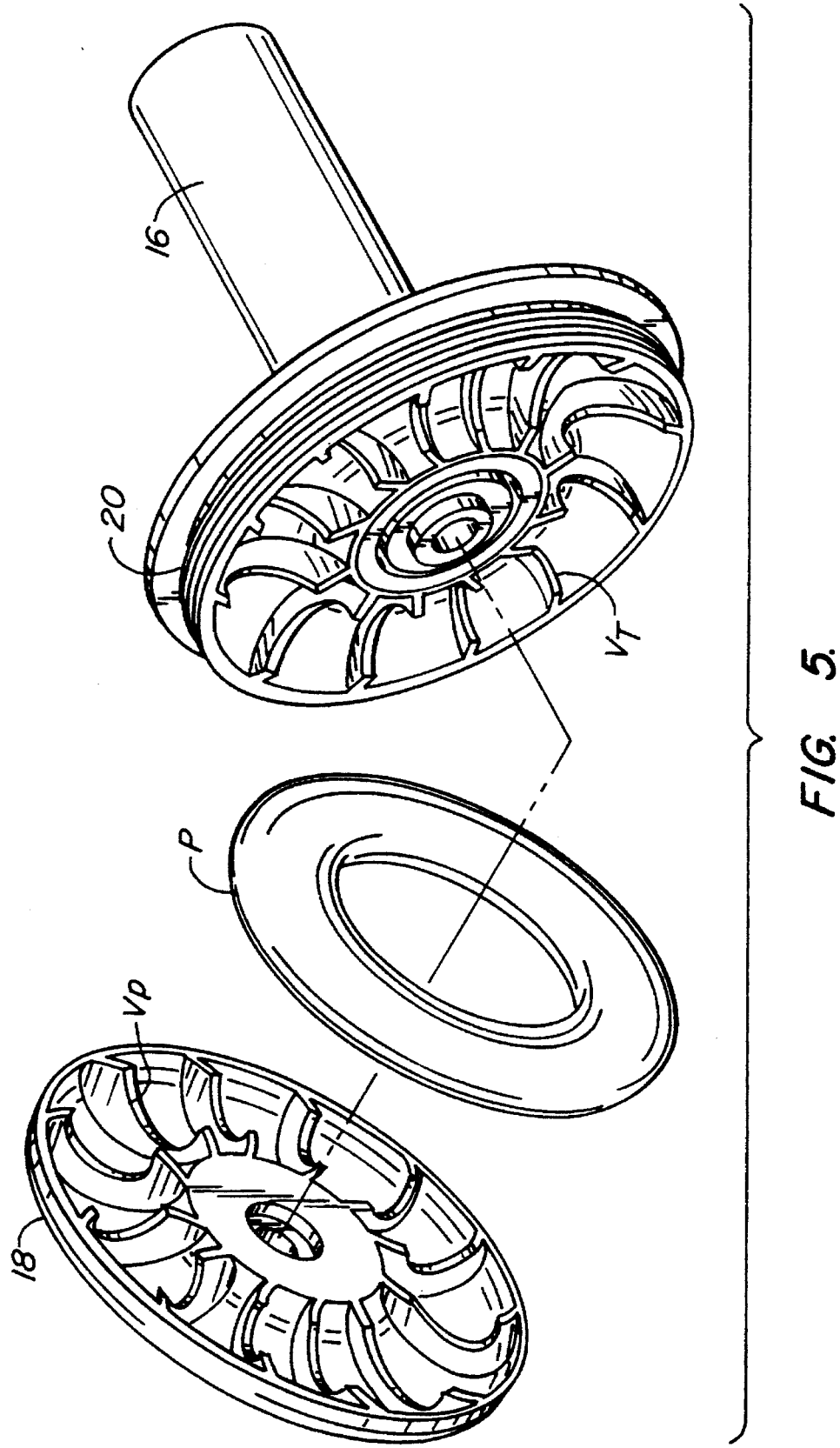
FIG. 5 is a perspective disassembled view taken with the axis of the assembled fluid coupling folded disclosing the relative locations of the respective assembled parts of the fluid coupling.

Referring to FIG. 5, it can be seen that pump 18 includes rotating vanes $V_p$ within one half a toroidal path having an attached eccentrically mounted toroidal plug P for causing helical rotation of fluid about the plug. Turbine T mates to pump 18 and includes rotating vanes $V_T$ within the other half of the toroidal path, these vanes being shaped around the toroidal plug P of the pump.

Figure 4:
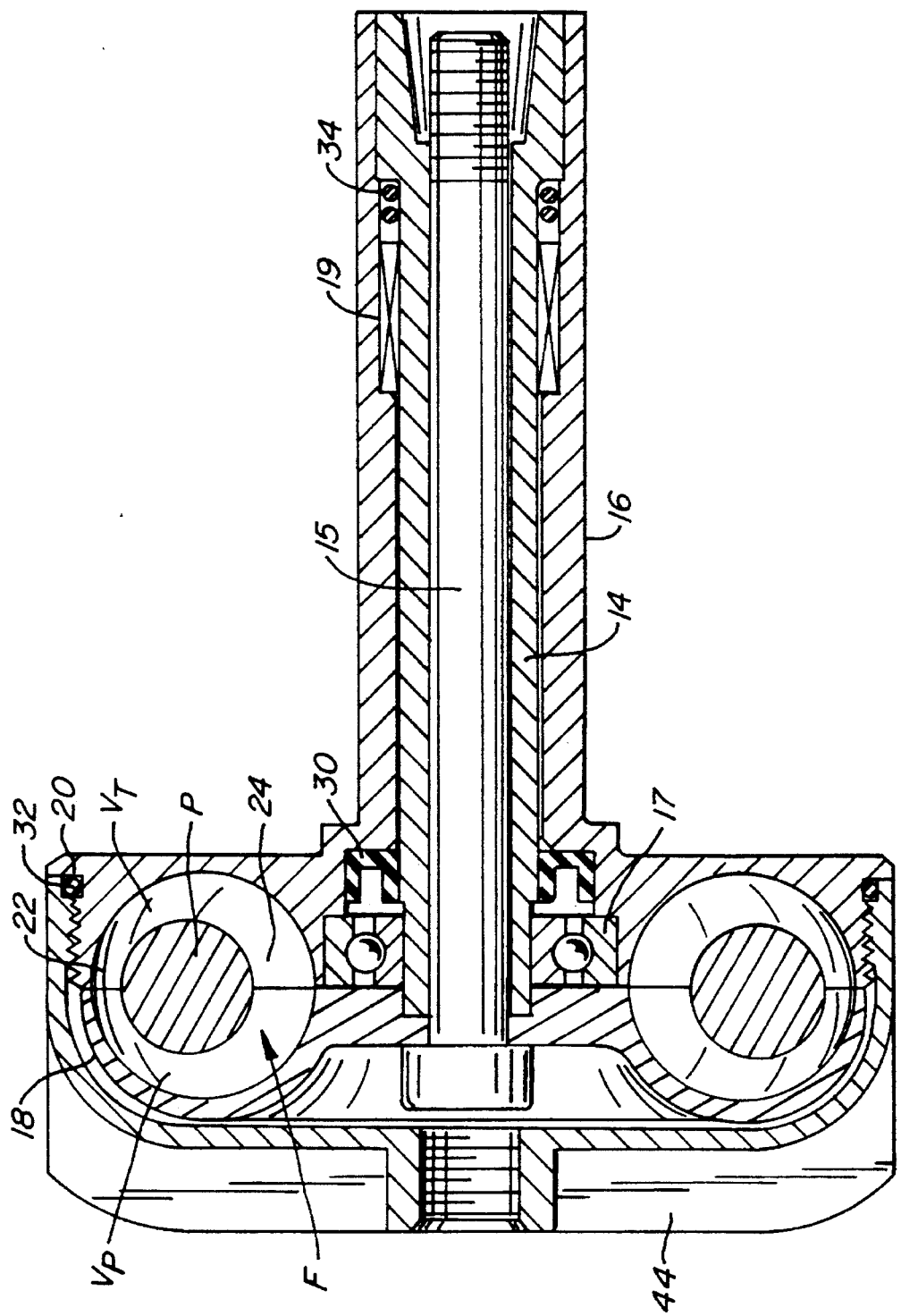
FIG. 4 is a side elevation section of the pump, turbine and pump cover.

Referring to the section of FIG. 4, toroidal plug P and toroidal volumes between vanes $V_p$ and $V_T$ are eccentrically mounted one with respect to one another. Such mounting causes high velocity flow on the outside diameter 22 of the pump and turbine with low velocity flow in the inside diameter 24 of the pump 18 and turbine 20.

An important note about vanes $V_p$ and $V_T$. These respective vanes have walls that are essentially parallel to the axis of rotation—such configuration while adding to the efficiency of the disclosed fluid coupling would add undue fabrication expense. This being the case, the vanes $V_p$ and $V_T$ have walls that are essentially parallel to the axis of rotation of pump 18 and turbine 20.

Fluid F, typically oil, is confined to the pump and turbine by appropriate seals 30, 32 and causes torque conversion between the pump and turbine.

Returning to FIGS. 1 and 2, it can be seen that in the preferred embodiment, a fuel tank 40 for the engine is mounted overlying the driven wheel so as to shield the interface of the wheel and driving spindle. At the same time, the exterior of the driven pump is supplied with air vanes 44 to generate appropriate air cooling at the fluid coupling.

Figure 6:
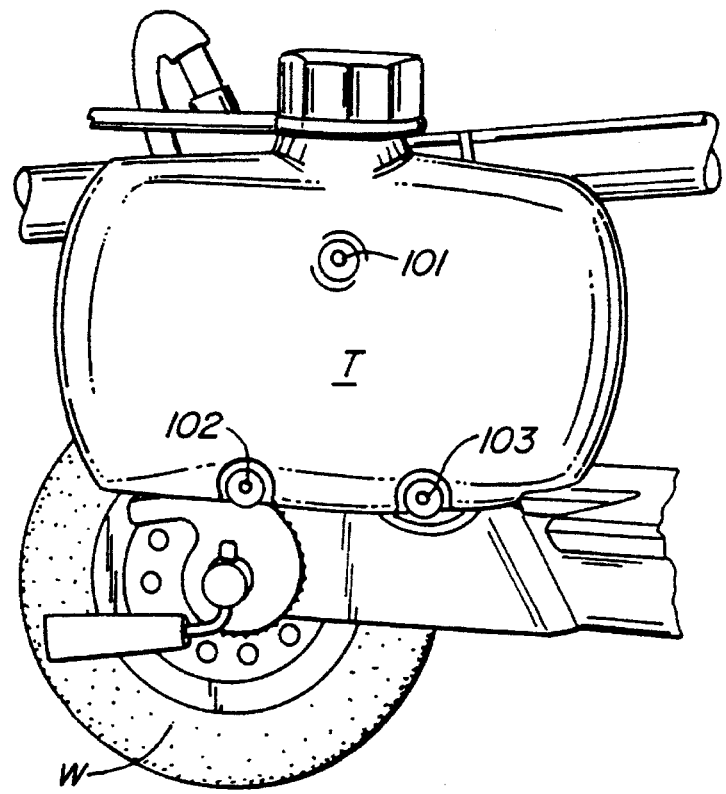
FIG. 6 is a perspective view of an assembled scooter at the driving wheel showing the fluid coupler with a gas tank covering the coupler.

Referring to FIG. 6, it is desirable to cover engine E with a tank T. This can be done with the cantilevered embodiment of this invention or alternately with a bearing as set forth in FIGS. 7 and 8.

Figure 7:
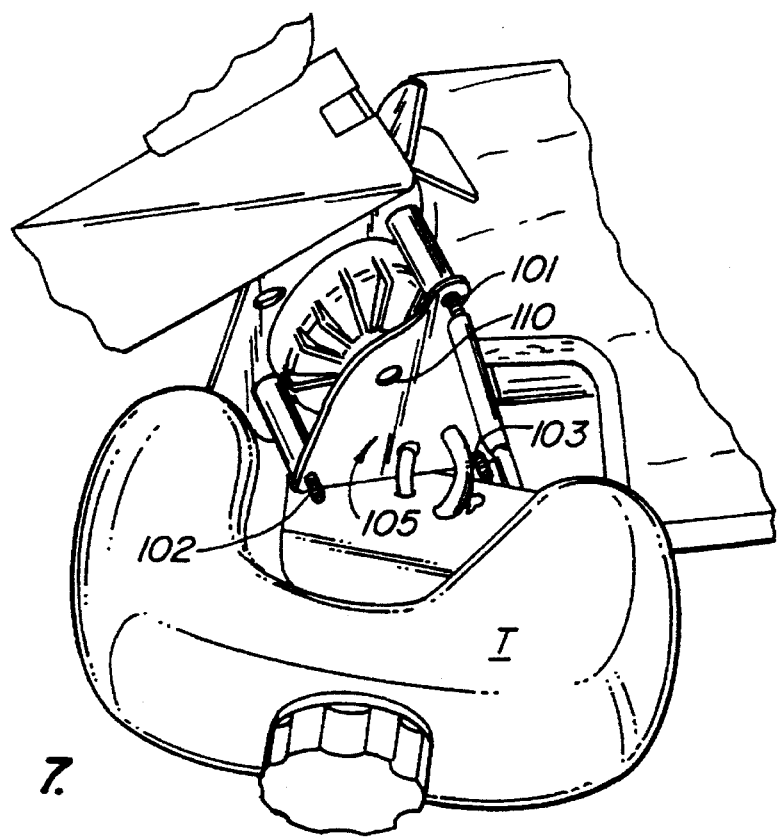
FIG. 7 is a perspective view of the gas tank removed and the fluid coupler reinforced by a bearing attached to a plate; and, FIG. 8 is a perspective view of the plate removed from the fluid coupler illustrating location of a bearing at the distal end of the coupler from the motor.

Referring to FIG. 6, tank T is shown held to the side of the illustrated scooter rear wheel W at respective bolts 101, 102, 103 with appropriate washers and lock nuts. Referring to FIG. 7, when tank T demounts from bolts 101–103, it exposes plate 105. Plate 105 in turn has a bearing mount 110 medially of the generally triangular plate 105.

Figure 8:
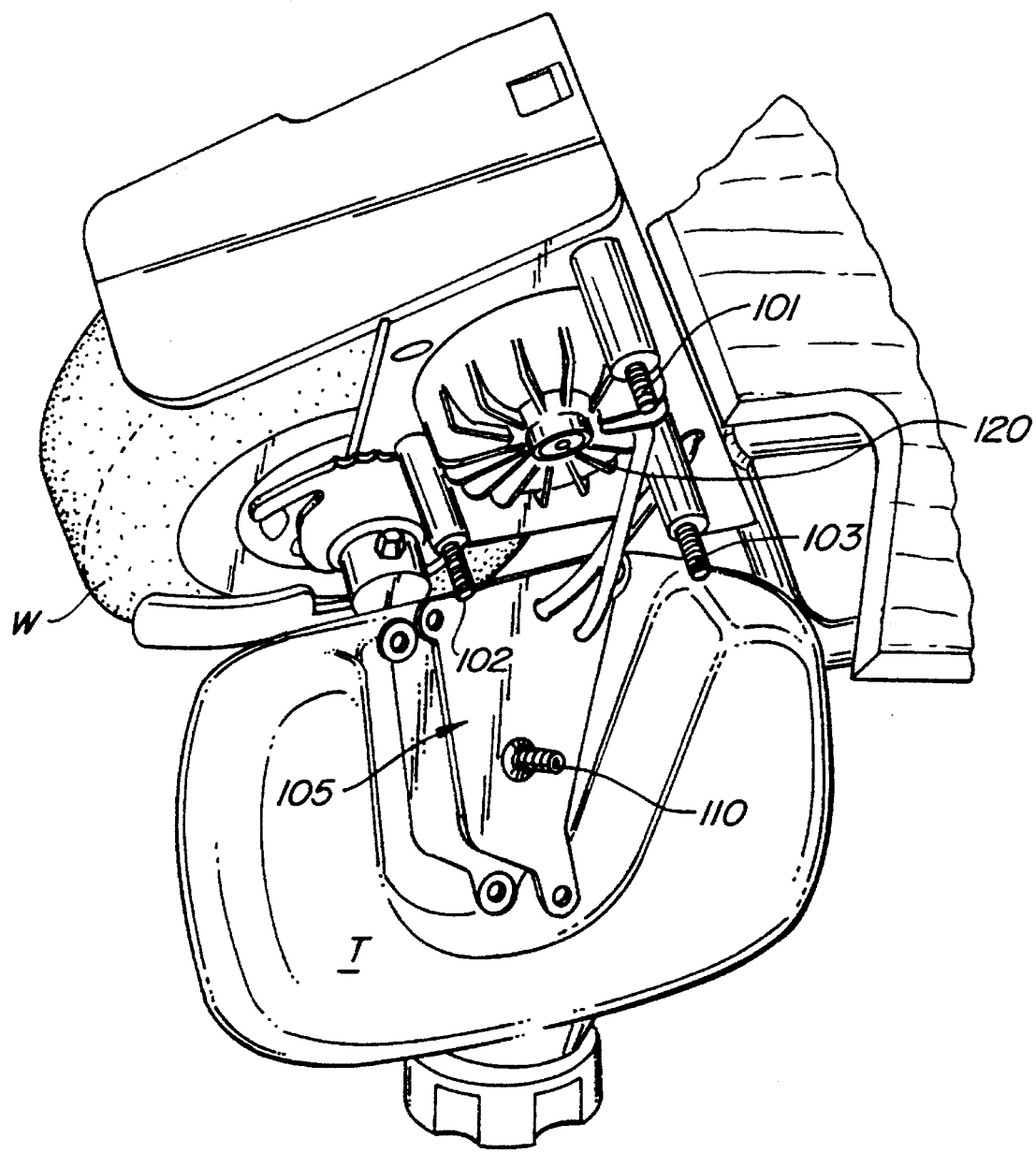

When plate 105 is in turn removed, it exposed bearing mount 110 which protrudes into and captures a bearing 120 on the outward, distal end of the fluid coupler remote from engine E (see FIG. 8).

What is claimed is:

1. In combination a wheel to be driven, a frame mounting said wheel to be driven for rotation about an axis, an engine, said engine mounted to said frame and having an output shaft substantially parallel to the axis of rotation of said wheel, and, a fluid coupling connecting said wheel to be driven and said engine, the improvement to said fluid coupling comprising in combination:

an inner driven shaft connected to said engine on one side of said wheel to be driven, and extending across said wheel to be driven on the opposite side of said wheel to be driven;

a pump having an exterior and said pump is connected to said driven shaft and rotating about said driven shaft on the opposite side of said wheel from said engine;

fluid communicated to said pump for receiving rotational energy from said engine;

an outer and wheel driving shaft concentrically mounted about and concentric to said inner and driving shaft;

a turbine mounted to said outer and wheel driving shaft and juxtaposed to and in fluid communication with said pump on the opposite side of said wheel for receiving rotational energy from said fluid passing through said pump; and, means sealing fluid between said pump and turbine for enabling fluid circulating between said pump and turbine to transfer torque between said pump and turbine and hence said input and output shaft for the driving of said wheel;

a shield mounted with said engine and extending over said wheel so as to shield an interface of said wheel and said outer and wheel driving shaft; and, air cooling vanes attached to said pump exterior for causing cooling air to circulate adjacent said fluid coupling.

2. The combination of claim 1 and wherein said pump and said turbine include fins disposed in a toric path axially about said inner and outer shafts.

3. The combination of claim 2 and wherein said fins are disposed in planes normal to the axis of said shafts.

4. The combination of claim 2 and wherein said pump and turbine are disposed about a toric plug extending within the toric path of said fins.

5. The combination of claim 4 and wherein said toric plug is eccentrically mounted with respect to said toric path to cause said fluid to move at higher velocity remote from said inner and outer shafts and at slower velocity adjacent said inner and out shafts.

6. The combination of claim 1 and wherein:

bearing means for supporting said outer and wheel driving shaft is provided.

7. The combination of claim 6 and wherein:

said shield extending over said interface includes a molded gas tank.

8. In combination a wheel to be driven, a frame mounting said wheel to be driven for rotation about an axis, an engine, said engine mounted to said frame and having an output shaft substantially parallel to the axis of rotation of said wheel, and, a fluid coupling connecting said wheel to be driven and said engine, the improvement to said fluid coupling comprising in combination:

an inner driven shaft connected to said engine on one side of said wheel to be driven, and extending across said wheel to be driven on the opposite side of said wheel to be driven;

a pump having an exterior and said pump is connected to said driven shaft and rotating about said driven shaft on the opposite side of said wheel from said engine, said pump having vanes disposed in a toric path concentrically around said inner shaft, said vanes terminating along a plane normal to said shaft at a circular plane around said pump;

fluid communicated to said pump for receiving rotational energy from said engine;

an outer and wheel driving shaft concentrically mounted about and concentric to said inner and driving shaft;

a turbine mounted to said outer and wheel driving shaft and having vanes disposed in a toric path corresponding in diameter to the toric path of said pump, said vanes terminating along a plane normal to said outer and driving shaft at circular plane around said pump, said vanes of said turbine juxtaposed to and in fluid communication with said vanes of said pump on the opposite side of said wheel for receiving rotational energy from said fluid passing through said pump; and, means sealing fluid between said pump and turbine for enabling fluid circulating between said pump and turbine to transfer torque between said pump and turbine and hence said input and output shaft for the driving of said wheel;

a shield mounted with said engine and extending over said wheel so as shield an interface of said wheel and said outer and wheel driving shaft; and, air cooling vanes attached to said pump exterior for causing cooling air to circulate adjacent said fluid coupling.

9. The invention of claim 8 an including:

a toric plug mounted in said toric path of said fins of said pump, said toric plug being disposed in said toric path to cause fluid to spiral about said plug during communication of fluid between said pump and turbine.

10. The invention of claim 9 and wherein said toric plug is adjacent to said toric path at portions of said path remote from the axis of said shaft to cause fluid passing remote from the axis of said shaft to move faster than fluid nearer the axis of said fluid path.

11. The combination of claim 8 and wherein:

said shield extending over said interface comprises a molded gas tank.

12. In combination a scooter wheel to be driven, a scooter frame mounting said wheel to be driven for rotation about an axis, an engine, said engine mounted to said scooter frame and having an output shaft substantially parallel to the axis of rotation of said scooter wheel, and, a fluid coupling connecting said scooter wheel to be driven and said engine attached to said scooter frame, the improvement to said fluid coupling comprising in combination:

an inner driven shaft connected to said engine on one side of said wheel to be driven, and extending across said wheel to be driven on the opposite side of said wheel to be driven;

a pump connected to said driven shaft and rotating about said driven shaft on an axis of rotation on the opposite side of said wheel from said engine, said pump having a diameter exceeding the diameter of said inner shaft but less than the diameter of said wheel;

fluid communicated to said pump for receiving rotational energy from said engine;

an outer and wheel driving shaft concentrically mounted about and concentric to said inner and driving shaft;

a turbine mounted to said outer and wheel driving shaft for rotation on said axis of rotation and juxtaposed to and in fluid communication with said pump on the opposite side of said wheel for receiving rotational energy from said fluid passing through said pump, said turbine having a diameter greater than the diameter of said driving shaft but less than the diameter of said driven wheel a shield mounted with said engine and extending over said wheel so as to shield an interface of said wheel and said outer and wheel driving shaft;

said pump and said turbine each having vanes having walls that are essentially parallel to the axis of rotation of said pump and turbine; and, means sealing fluid between said pump and turbine for enabling fluid circulating between said pump and turbine to transfer torque between said pump and turbine and hence said input and output shaft for the driving of said wheel.

13. The invention of claim 12 and including a housing about said turbine for rotation with said turbine, said housing defining cooling fins on the exterior thereof for moving air during operation of said fluid coupling and cooling the fluid passing between said pump and turbine.

14. The combination of claim 12 and wherein:

bearing means for supporting said outer and wheel driving shaft is provided.

* * * * *